(12) United States Patent
Prabhakaran (10) Patent No.: US 10,465,960 B2
(45) Date of Patent: Nov. 5, 2019

(54) METHOD AND SYSTEM FOR MONITORING REFRIGERATION SYSTEM

(71) Applicant: CARRIER CORPORATION, Jupiter, FL (US)

(72) Inventor: Baburaj Kaimalilputhenpura Prabhakaran, Calicut (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 288 days.

(21) Appl. No.: 15/443,256

(22) Filed: Feb. 27, 2017

(65) Prior Publication Data
US 2018/0142929 A1 May 24, 2018

(30) Foreign Application Priority Data
Nov. 23, 2016 (IN) .............................. 201641040012

(51) Int. Cl.
*F25B 49/00* (2006.01)
*F25D 21/00* (2006.01)
(Continued)

(52) U.S. Cl.
CPC .......... *F25B 49/005* (2013.01); *F25D 21/006* (2013.01); *F25D 21/08* (2013.01);
(Continued)

(58) Field of Classification Search
CPC ................ F25B 49/005; F25B 2600/01; F25B 2700/21; F25B 2500/19; F25D 21/006;
(Continued)

(56) References Cited

U.S. PATENT DOCUMENTS 4,234,926 A * 11/1980 Wallace ................. G01D 9/005
700/2
4,993,233 A 2/1991 Borton et al.
(Continued)

FOREIGN PATENT DOCUMENTS

CN 104930645 A 9/2015
EP 3090224 A1 11/2016
(Continued)

OTHER PUBLICATIONS

International Search Report and Written Opinion for application PCT/US2017/063077, dated Mar. 8, 2017, 12 pages.
(Continued)

*Primary Examiner* — Emmanuel E Duke
(74) *Attorney, Agent, or Firm* — Cantor Colburn LLP (57) ABSTRACT

The present disclosure relates to a method and a system for monitoring health of a refrigeration system. The present disclosure also relates to an Internet Of Things (IOT) enabled method and system for monitoring health of the WIF based on performance parameters like defrost cycle related parameters, defrost cycle duration, schedule and frequency. In one embodiment, the method receives a plurality of real-time temperature data collected by a temperature sensor and determines a steady state value based on the received real-time temperature data. Further, the method computes a plurality of defrost cycle parameter values and generate alarm signals based on deviations of the computed defrost cycle parameters from the respective threshold values. The method generates reports indicating patterns of defrost duration and defrost distribution over a time and provide recommendations to support maintenance of the refrigeration system in response to the deviations.

19 Claims, 5 Drawing Sheets

(51) Int. Cl.
*F25D 21/08* (2006.01)
*G05B 19/048* (2006.01)
*G05B 23/02* (2006.01)
*F25D 29/00* (2006.01)

(52) U.S. Cl.
CPC ......... *G05B 19/048* (2013.01); *G05B 23/027* (2013.01); *F25B 2500/19* (2013.01); *F25B 2600/01* (2013.01); *F25B 2700/21* (2013.01); *F25D 21/008* (2013.01); *F25D 29/008* (2013.01); *G05B 2219/2654* (2013.01)

(58) Field of Classification Search
CPC ...... F25D 21/08; F25D 21/008; F25D 29/008; F24F 11/006; G05B 23/027; G05B 19/048; G05B 23/0235; G05B 15/02; G05B 2219/2654; G06Q 10/20; G06Q 10/087
See application file for complete search history.

(56) References Cited

U.S. PATENT DOCUMENTS

| | | | |
|---|---|---|---|
| 6,467,282 B1 | 10/2002 | French et al. | |
| 6,601,396 B2* | 8/2003 | Bair, III | F25D 21/008 62/155 |
| 6,672,086 B2* | 1/2004 | Zangari | F25D 17/042 62/156 |
| 7,644,591 B2* | 1/2010 | Singh | A23G 9/00 62/127 |
| 7,716,936 B2 | 5/2010 | Bailey et al. | |
| 9,121,407 B2 | 9/2015 | Pham | |
| 9,285,802 B2* | 3/2016 | Arensmeier | G05B 23/0224 |
| 9,638,436 B2* | 5/2017 | Arensmeier | G05B 15/02 |
| 2002/0000092 A1* | 1/2002 | Sharood | F25D 29/00 62/127 |
| 2004/0244389 A1* | 12/2004 | Denvir | F25D 21/002 62/156 |
| 2005/0011205 A1* | 1/2005 | Holmes | F25D 29/00 62/156 |
| 2007/0295015 A1* | 12/2007 | Bailey | F25D 21/006 62/150 |
| 2008/0092569 A1* | 4/2008 | Doberstein | F25D 21/006 62/156 |
| 2012/0186274 A1* | 7/2012 | Cwiertniewicz | F25B 49/005 62/56 |
| 2013/0118195 A1* | 5/2013 | Ikemiya | F25B 49/005 62/126 |
| 2014/0000292 A1 | 1/2014 | Kates | |
| 2014/0074730 A1* | 3/2014 | Arensmeier | G06Q 10/20 705/305 |
| 2014/0165630 A1* | 6/2014 | Langenberg | F25D 21/006 62/80 |
| 2014/0313055 A1* | 10/2014 | Warkentin | H04Q 9/00 340/870.16 |

FOREIGN PATENT DOCUMENTS

| | | |
|---|---|---|
| JP | H0791813 A | 4/1995 |
| JP | 2001091125 A | 4/2001 |
| JP | 2005037010 A | 2/2005 |
| JP | 2007225263 A | 9/2007 |
| JP | 2013242078 A | 12/2013 |

OTHER PUBLICATIONS

Indian Office Action for application 201641040012, dated Jul. 29, 2019, U3012921N, 5 pages.

* cited by examiner

METHOD AND SYSTEM FOR MONITORING REFRIGERATION SYSTEM

FIELD OF THE DISCLOSURE

The present subject matter is related, in general to refrigeration systems, and more particularly, but not exclusively to a method and a system for monitoring health of refrigeration systems.

BACKGROUND

Refrigeration system plays a key role in controlling the quality and safety of the food product. Walk-in Freezers are critical asset for restaurants as they have an impact on taste, texture as well as the food safety. The non-availability or downtime of these units can also cause business disruption at the site resulting in loss in sales and food turning into nonedible, finally disposing the food, where temperature limits have been breached. Thus, any breakdown in the refrigeration system or variation in performance of the refrigeration system can cause food quality and safety issues. Thus, it is important to monitor and maintain the equipment of the refrigeration system to ensure its operation at expected levels.

Monitoring refrigeration system performance, maintenance and energy consumption are tedious and time-consuming operations and are undesirable for retailers to perform independently. Generally, retailers lack the expertise to accurately analyze time and temperature data and relate that data to food product quality and safety, as well as the expertise to monitor the refrigeration system for performance, maintenance and efficiency. Further, a typical food retailer includes a plurality of retail locations spanning a large area. Monitoring each of the retail locations on an individual basis is inefficient and often results in redundancies. Therefore, there is a need for a method and a system that automatically monitors the operations and performance of intermittent use refrigeration assets.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of monitoring a refrigeration system. The method comprising the step of receiving a plurality of real-time temperature data from at least one temperature sensor coupled with the refrigeration system. The method further comprises the step of determining at least a first steady state value and a second steady state value based on the plurality of real-time temperature data. Based on at least the first steady state value and the second steady state value, a plurality of defrost cycle parameter values including at least defrost start time value, defrost end time value, peak temperature value, heater OFF time value, and heater ON duration value is computed. Upon computing the plurality of defrost cycle parameter values, one or more alarm signals is generated if deviations of at least one of the defrost cycle parameter values from respective predetermined threshold values is determined.

Further, the present disclosure relates to a system for monitoring a refrigeration system. The system comprises at least a processor and at least one temperature sensor coupled with the processor. The system further comprises a memory communicatively coupled with the processor, wherein the memory stores processor-executable instructions, which, on execution, cause the processor to receive a plurality of real-time temperature data from the at least one temperature sensor and determine at least a first steady state value and a second steady state value based on the plurality of real-time temperature data. Further, the processor is configured to compute a plurality of defrost cycle parameter values including at least defrost start time value, defrost end time value, peak temperature value, heater OFF time value, and heater ON duration value based on at least the first steady state value and the second steady state value. Furthermore, the processor generates one or more alarm signals based on determination of deviations of at least one of the defrost cycle parameter values from respective predetermined threshold values.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises". "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and a system for monitoring health of a refrigeration system. Monitoring the refrigeration system such as Walk-In Freezer (WIF) during operation allows prediction of WIF failure in advance. The performance of the WIF is monitored based on data that is collected in logs during the operation. The present disclosure also relates to an Internet Of Things (IOT) enabled method and system for monitoring health of the WIF based on performance parameters like defrost cycle related parameters, defrost cycle duration, schedule and frequency. In one embodiment, the method receives a plurality of real-time temperature data collected by a temperature sensor and determines a steady state value based on the received real-time temperature data. Further, the method computes a plurality of defrost cycle parameter values and generates alarm signals based on deviations of the computed defrost cycle parameters from the respective threshold values. Also, the method generates reports indicating patterns of defrost duration and defrost distribution over a time and provides recommendations to support maintenance of the refrigeration system in response to the deviations.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
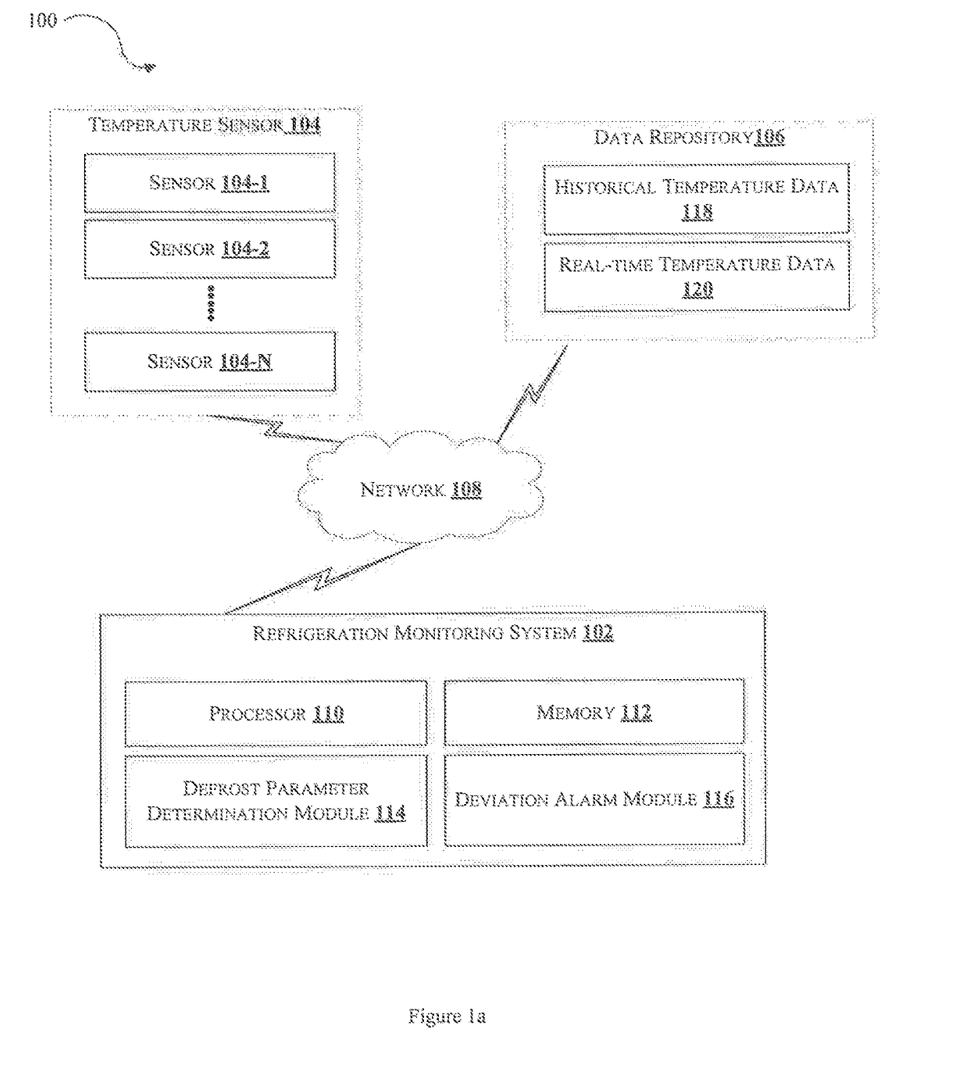
FIG. 1a illustrates an architecture diagram of an exemplary system for monitoring health of refrigeration system in accordance with some embodiments of the present disclosure.

FIG. 1a illustrates an architecture diagram of an exemplary system for monitoring health of a refrigeration system in accordance with some embodiments of the present disclosure.

As shown in FIG. 1a, the exemplary system 100 comprises one or more components configured for monitoring a refrigeration system. In one embodiment, the exemplary system 100 comprises a refrigeration monitoring system (hereinafter referred to as RMS) 102, one or more temperature sensors 104-1, 104-2, . . . 104-N (hereinafter collectively referred to as temperature sensor 104) and a data repository 106 connected via a communication network 108.

Figure 1B:
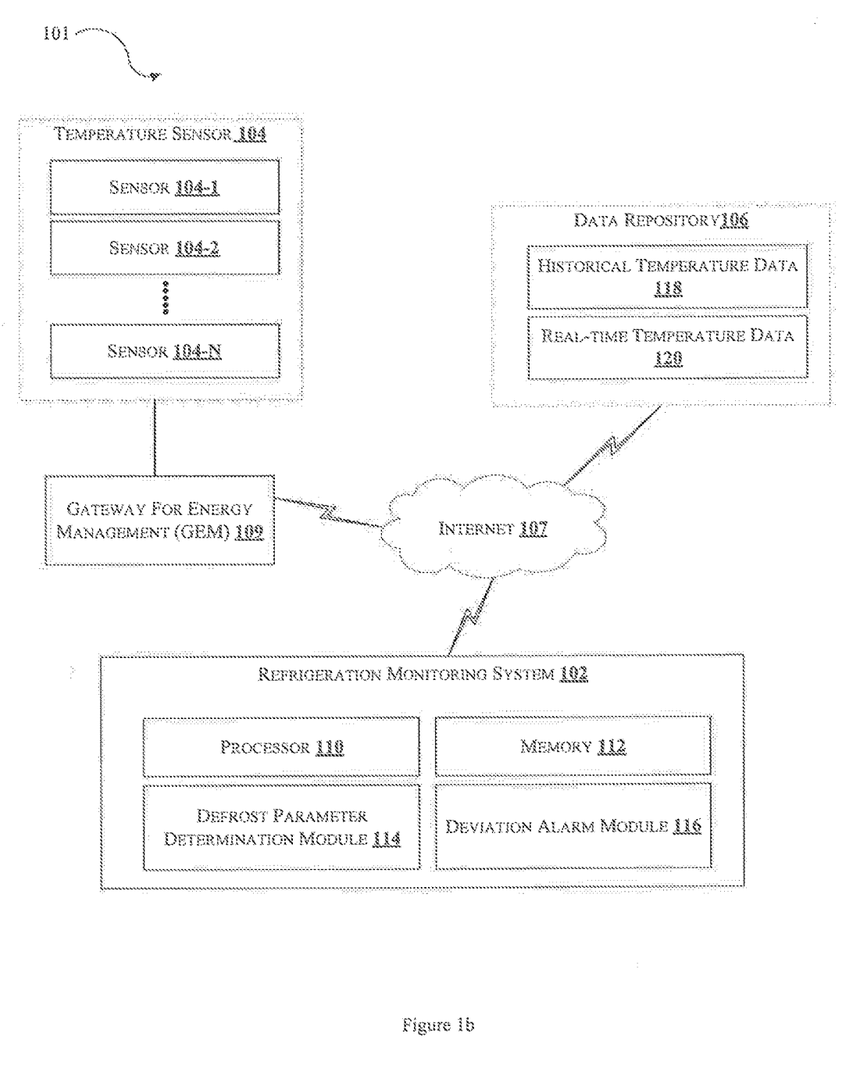
FIG. 1b illustrates an architecture diagram of an exemplary Internet of Things (IOT) System for monitoring health of refrigeration system in accordance with some embodiments of the present disclosure.

FIG. 1b illustrates another exemplary system 101 implemented as an Internet Of Things (IOT) enabled system comprising one or more components communicatively connected via the Internet 107 as shown in FIG. 1b. The IOT system 101 comprise a gateway for energy management (GEM) 109 communicatively coupled with the RMS 102 via the Internet 107. In one embodiment, the GEM 107 comprises a plurality of interfaces for transmitting data associated with operating conditions of the refrigeration system to the RMS 102. The plurality of interfaces may be for example, Wireless Zig Bee interface, Global System for Mobile communication (GSM)/General Packet Radio Service (GPRS) interface, Wireless Internet for Frequent Interface (WIFI), and Ethernet interface. The GEM 109 may also comprise an Analog-to-Digital Converter (ADC) (not shown in FIG. 1b), and an analog interface (not shown in FIG. 1b) coupled with the ADC and the temperature sensor 104. The analog interface receives real-time temperature data from the temperature sensor 104 in the form of analog signal. The ADC converts the received analog signal into a corresponding digital signal for further processing by RMS 102.

The system 100, 101 may be communicatively coupled to a data receiver module (not shown in FIGS. 1a, 1b) and a depacketizer module (not shown in FIGS. 1a, 1b) integrated within the RMS 102. In another embodiment, the data receiver module and the depacketizer module may be externally coupled with the RMS 102. The data receiver module is configured to receive data from the GEM 109 via the Internet 107. In another implementation, the data receiver module is configured to receive data from the temperature sensor 104 via the communication network 108 and forward the received data to the depacketizer module. The depacketizer module is configured to decode the received data for further processing by RMS 102 and update the data repository 106 with the received data.

The data repository 106 stores historical temperature data 118 i.e. a plurality of temperature data recorded for at least a week in the past obtained by the temperature sensor 104. The data repository 106 also stores a plurality of real-time temperature data 120 received in real-time from the temperature sensor 104 and the depacketizer module. The historical temperature data 118 and the real-time temperature data 120 may be encoded using known encoding techniques before storing in the data repository 106. In one embodiment, the data repository 106 may be integrated within the RMS 102. In another embodiment, the data repository 106 may be implemented as standalone device disposed external to the RMS 102.

Figure 2:
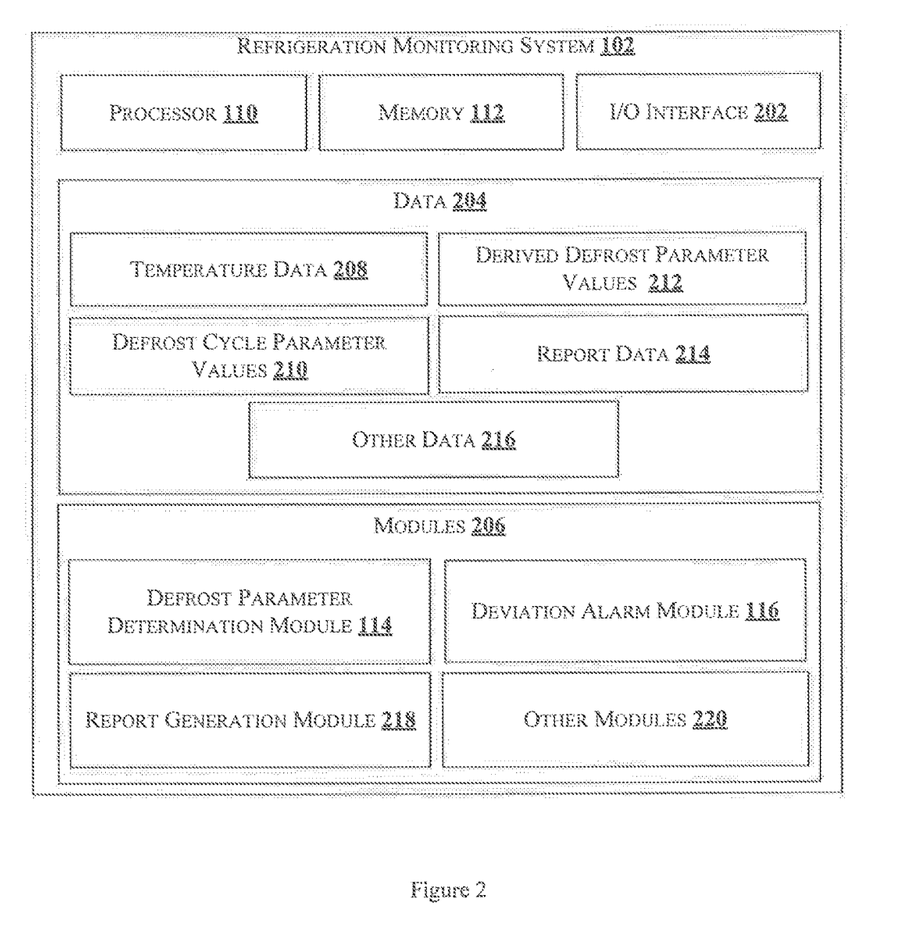
FIG. 2 illustrates an exemplary block diagram of a monitoring system of FIGS. 1a and 1b in accordance with some embodiments of the present disclosure.

As illustrated in FIGS. 1a and 1b, the RMS 102 comprises at least a processor 110 and a memory 112 coupled with the processor 110. The RMS 102 further comprises a defrost parameter determination module (DPDM) 114, and a deviation alarm module (hereinafter referred to as alarm module) 116. The temperature sensor 104, may be coupled with the processor 110 and configured to track the changes in temperature of the refrigeration system. In one example, the temperature sensor 104 may be a condition sensor capable of tracking the changes in the state and operating conditions of the refrigeration system. The RMS 102 may be a typical RMS as illustrated in FIG. 2. The RMS 102 comprises the processor 110, the memory 112, and an I/O interface 202. The I/O interface 202 is coupled with the processor 110 and an I/O device. The I/O device is configured to receive inputs via the I/O interface 202 and transmit outputs for displaying in the I/O device via the I/O interface 202. The RMS 102 further comprises data 204 and modules 206. In one implementation, the data 204 and the modules 206 may be stored within the memory 112. In one example, the data 204 may include a plurality of temperature data 208, a plurality of defrost cycle parameter values 210, one or more derived defrost parameter values 212, report data 214 and other data 216. In one embodiment, the data 204 may be stored in the memory 112 in the form of various data structures. Additionally, the aforementioned data can be organized using data models, such as relational or hierarchical data models. The other data 216 may be also referred to as reference repository for storing recommended implementation approaches as reference data. The other data 216 may also store data, including temporary data, temporary files and predetermined threshold values of the defrost cycle parameters and derived defrost parameters, generated by the modules 206 for performing the various functions of the RMS 102.

The modules 206 may include, for example, the DPDM 114, the alarm module 116, and a report generation module 218. The modules 206 may also comprise other modules 220 to perform various miscellaneous functionalities of the RMS 102. It will be appreciated that such aforementioned modules may be represented as a single module or a combination of different modules. The modules 206 may be implemented in the form of software, hardware and/or firmware.

In operation, the RMS 102 monitors the health of a refrigeration system such as Walk-In Freezer (WIF). The RMS 102 enables tracking of state and operational changes of the refrigeration system and provide efficiency measures required for improving the operational performance. In one embodiment, the RMS 102 monitors the performance of the refrigeration system based on one or more performance parameters determined based on temperature profile of the refrigeration system. In one aspect, the RMS 102 receives the plurality of real-time temperature data 208 from the temperature sensor 104. The temperature sensor 208 determines the temperature of the WIF in real-time and provide a signal to the RMS 102 indicative of the plurality of temperature data 208. In another example, the temperature sensor 104 may be configured to provide a signal indicating the status of operating conditions of the WIF.

The processor 110 receives the plurality of real-time temperature data 208 from the temperature sensor 104 and processes the received plurality of temperature data 208 to determine performance of the defrost operations. In one embodiment, the processor 110 receives the plurality of real-time temperature data 208 along with the respective time stamp indicating the time of recording the plurality of real-time temperature data 208 by the temperature sensor 104. In one example, the plurality of real-time temperature data 208 may be received as analog signals from the temperature sensor 104 as indicated in FIG. 1a. The processor 110 converts the received analog signals into corresponding digital form for further processing. In another example, the plurality of real-time temperature data 208 may be received in analog form by the GEM 109 and converted into corresponding digital form by the ADC of the GEM 109. The processor 110 pre-processes the plurality of real-time temperature data 208 received in digital form by employing various data sampling and parsing techniques. Upon pre-processing, the processor 110 enables determination of the defrost cycle parameter values 210 based on the pre-processed plurality of real-time temperature data 208.

In one embodiment, the processor 110 determines at least a first steady state value and a second steady state value based on the plurality of pre-processed real-time temperature data 208. Initially, the steady state value refers to a steady state temperature determined from the historic data of previous week or set with a reference value of −18 degree Celsius and updated periodically. In one embodiment, the processor 110 determines the first steady state value by comparing each of the received plurality of the real-time temperature data 208 with a predetermined percentile temperature value. In one example, the predetermined percentile temperature value is set to a $75^{th}$ percentile of the temperature recorded in a previous day. The processor 110 performs comparison of each of the plurality of real-time temperature data 208 with the $75^{th}$ percentile of temperature and determines one real-time temperature data that exceeds the $75^{th}$ percentile temperature value as the first steady state value based on the comparison. The processor 110 further determines the second steady state value as the one real-time temperature data that exceeds the $75^{th}$ percentile temperature value during the defrost operation. Based on at least the first steady state value and the second steady state value, the RMS 102 determines the plurality of defrost cycle parameter values 210.

In one embodiment, the DPDM 114 determines the plurality of defrost cycle parameter values 210 such as for example, defrost start time value, peak temperature value, defrost end time value, heater ON duration value, heater OFF time value, and defrost cycle duration value. The DPDM 114 obtains the time stamp of the first steady state value as the defrost start time value. The DPDM 114 further determines one of the real-time temperature data having highest temperature value as the peak temperature value. Based on the time stamp of the peak temperature value, the DPDM 114 determines the heater OFF time value. Further, the DPDM 114 calculates the heater ON duration based on the defrost Start time value and the heater OFF time value as indicated below in equation (1).

$$\text{Heater ON duration} = \text{Heater OFF time} - \text{Defrost Start time value} \quad (1)$$

Further, the DPDM 114 determines the time stamp of the second steady state value as the defrost End time value and computes the defrost cycle duration value based on the defrost Start time value and the defrost End time value as indicated below in equation (2).

$$\text{Defrost Duration} = \text{Defrost End time value} - \text{Defrost Start time value} \quad (2)$$

Based on the determined defrost cycle parameter values 210, the RMS 102 determines the derived defrost parameter values 212 to determine deviations of the performance of the refrigeration system. In one embodiment, the alarm module 116 determines the one or more derived defrost parameter values 212 such as count of defrost cycles in a predetermined time, defrost schedule, longer heater operation period and so on. The alarm module 116 determines the frequency or count of defrost cycles occurring in a predetermined time and performs comparison of the count of defrost cycles with a predetermined threshold count value. The alarm module 116 generates a first alarm signal if the count of defrost cycles is determined to exceed the predetermined threshold count value. Further, the alarm module 116 determines probability of occurrence of the one or more defrost cycles as per a predetermined schedule and generates a second alarm signal based on the determination. In one example, if the alarm module 116 determines low probability or lack of adherence of the defrost cycle operation as per the predetermined schedule, the alarm module 116 generates the second alarm signal.

Furthermore, the alarm module 116 determines longer heater operation period by performing comparison of the heater ON duration value with a predetermined heater operation period. If the heater ON duration value is determined to exceed the predetermined heater operation period, then the alarm module 116 generates a third alarm signal indicating the longer heater operation period. Also, the alarm module 116 determines a compressor inefficiency detection value based on the first steady state value and the plurality of real-time temperature data 208 obtained through the temperature sensor 104. In one example, the compressor inefficiency detection value may be determined based on equation (3):

$$\text{Compressor inefficiency detection value} = (6 * \text{first steady state value} + [\text{median real-time temperature data} + \text{mode real-time temperature data}]/2)/7 \quad (3)$$

Based on the determination of compressor inefficiency detection value, the alarm module 116 generates a fourth alarm signal indicating flag for maintenance if the compressor inefficiency detection value is determined to exceed a predetermined inefficiency threshold value. Further, the alarm module 116 provides one or more recommendations to support maintenance of the refrigeration system in response to determination of deviations of at least one of the defrost cycle parameters 210.

Further, the RMS 102 generates one or more reports indicating patterns of defrost duration and defrost duration distribution over a time. In one embodiment, the report generation module 218 generates one or more report data 214 comprising visualization data of patterns of defrost duration and defrost duration distribution over a time, patterns of door opening to detect unusual door opening from the peak temperature value. The RMS 102 may be communicatively coupled to a display unit (not shown in FIGS. 1a and 1b) for displaying the visualization reports and recommendations or suggestions in the form of alarm signals. In one implementation, the report generation module 218 enables displaying the visualization reports and recommendations or suggestions in the form of visualization reports or graphs or charts or alarm signals. The RMS 102 also updates the repository 106 with the plurality of real-time temperature data 208 along with the timestamp, the plurality of defrost cycle parameters 210, the one or more deviations of the at least one defrost cycle parameters 210 and one or more recommendations to support maintenance of the refrigeration system.

Thus, the system enables monitoring the status or health of the refrigeration and predicting the possibility of maintenance required by leveraging the time stamped temperature data & statistical means. The system also enables the enterprise view of the asset health system to the needs of the customer, reducing the operational cost, wastage of food & maintain the Food safety norms as per the standard.

Figure 3:
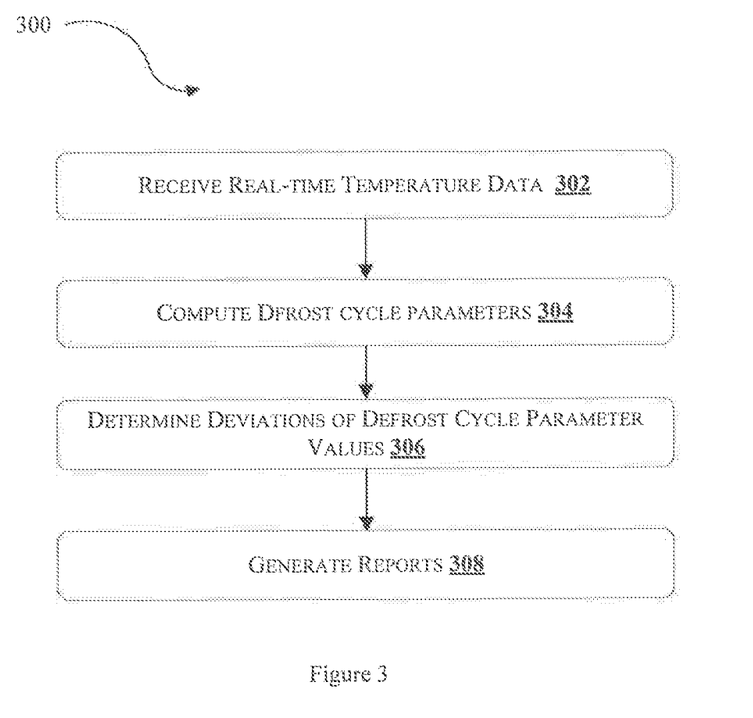
FIG. 3 illustrates a flowchart of an exemplary method of monitoring health of refrigeration system in accordance with some embodiments of the present disclosure.

FIG. 3 illustrates a flowchart of a method of automatically generating test data for testing applications in accordance with some embodiments of the present disclosure.

As illustrated in FIG. 3, the method 300 comprises one or more blocks implemented by the processor 110 for monitoring the refrigeration system. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware, software, firmware, or combination thereof.

At block 302, receive real-time temperature data. In one embodiment, the RMS 102 monitors the performance of the refrigeration system based on one or more performance parameters determined based on temperature profile of the refrigeration system. In one aspect, the RMS 102 receives the plurality of real-time temperature data 208 from the temperature sensor 104. The temperature sensor 208 determine the temperature of the WIF in real-time and provide a signal to the RMS 102 indicative of the plurality of temperature data 208. In another example, the temperature sensor 104 may be configured to provide a signal indicating the status of operating conditions of the WIF.

The processor 110 receives the plurality of real-time temperature data 208 along with the respective time stamp indicating the time of recording the plurality of real-time temperature data 208 by the temperature sensor 104. In one example, the plurality of real-time temperature data 208 may be received as analog signals from the temperature sensor 104 as indicated in FIG. 1a. The processor 110 converts the received analog signals into corresponding digital form for further processing. In another example, the plurality of real-time temperature data 208 may be received in analog form by the GEM 109 and converted into corresponding digital form by the ADC of the GEM 109. The processor 110 pre-processes the plurality of real-time temperature data 208 received in digital form by employing various data sampling and parsing techniques. Upon pre-processing, the processor 110 enables determination of the defrost cycle parameter values 210 based on the pre-processed plurality of real-time temperature data 208.

At block 304, compute defrost cycle parameters. In one embodiment, the processor 110 determines at least a first steady state value and a second steady state value based on the plurality of pre-processed real-time temperature data 208. In one embodiment, the processor 110 determines the first steady state value by comparing each of the received plurality of the real-time temperature data 208 with a $75^{th}$ percentile temperature value. The processor 110 further determines the second steady state value as the one real-time temperature data that exceeds the $75^{th}$ percentile temperature value during the defrost operation. Based on at least the first steady state value and the second steady state value, the RMS 102 determines the plurality of defrost cycle parameter values 210.

The DPDM 114 determines the plurality of defrost cycle parameter values 210 such as for example, defrost start time value, peak temperature value, defrost end time value, heater ON duration value, heater OFF time value, and defrost cycle duration value. The DPDM 114 obtains the time stamp of the first steady state value as the defrost start time value. The DPDM 114 further determines one of the real-time temperature data having highest temperature value as the peak temperature value. Based on the time stamp of the peak temperature value, the DPDM 114 determines the heater OFF time value. Further, the DPDM 114 calculates the heater ON duration based on the defrost Start time value and the heater OFF time value. Further, the DPDM 114 determines the time stamp of the second steady state value as the defrost End time value and computes the defrost cycle duration value based on the defrost Start time value and the defrost End time value. Based on the determined defrost cycle parameter values 210, the RMS 102 determines the derived defrost parameter values 212 to determine deviations of the performance of the refrigeration system.

At block 306, determine deviations of defrost cycle parameter values. In one embodiment, the alarm module 116 determines the one or more derived defrost parameter values 212 such as count of defrost cycles in a predetermined time, defrost schedule, longer heater operation period and so on. The alarm module 116 determines the frequency or count of defrost cycles occurring in a predetermined time such as 24 hours i.e. a day or a week, and performs comparison of the count of defrost cycles with a predetermined threshold count value. The alarm module 116 generates a first alarm signal if the count of defrost cycles is determined to exceed the predetermined threshold count value. Further, the alarm module 116 determines probability of occurrence of the one or more defrost cycles as per a predetermined schedule and generates a second alarm signal based on the determination. In one example, if the alarm module 116 determines low probability or lack of adherence of the defrost cycle operation as per the predetermined schedule, the alarm module 116 generates the second alarm signal.

Furthermore, the alarm module 116 determines longer heater operation period by performing comparison of the heater ON duration value with a predetermined heater operation period. If the heater ON duration value is determined to exceed the predetermined heater operation period, then the alarm module 116 generates a third alarm signal indicating the longer heater operation period. Also, the alarm module 116 determines a compressor inefficiency detection value based on the first steady state value and the plurality of real-time temperature data 208 obtained through the temperature sensor 104.

Based on the determination of compressor inefficiency detection value, the alarm module 116 generates a fourth alarm signal indicating flag for maintenance if the compressor inefficiency detection value is determined to exceed a predetermined inefficiency threshold value. Further, the alarm module 116 provides one or more recommendations to support maintenance of the refrigeration system in response to determination of deviations of at least one of the defrost cycle parameters 210.

At block 308, generate reports. In one embodiment, the RMS 102 generates one or more reports indicating patterns of defrost duration and defrost duration distribution over a time. In one embodiment, the report generation module 218 generates one or more report data 214 comprising visualization data of patterns of defrost duration and defrost duration distribution over a time, patterns of door opening to detect unusual door opening from the peak temperature value. The report generation module 218 also enables displaying the visualization reports and recommendations or suggestions in a display unit in the form of alarm signals or positions in the visualization reports or graphs or charts. The RMS 102 also updates the repository 106 with the plurality of real-time temperature data 208 along with the timestamp, the plurality of defrost cycle parameters 210, the one or more deviations of the at least one defrost cycle parameters 210 and one or more recommendations to support maintenance of the refrigeration system.

Thus, the system enables monitoring the status or health of the refrigeration and predicting the possibility of maintenance required by leveraging the time stamped temperature data & statistical means. The system also enables the enterprise view of the asset health system to the needs of the customer, reducing the operational cost, wastage of food & maintain the food safety norms as per the standard.

Figure 4:
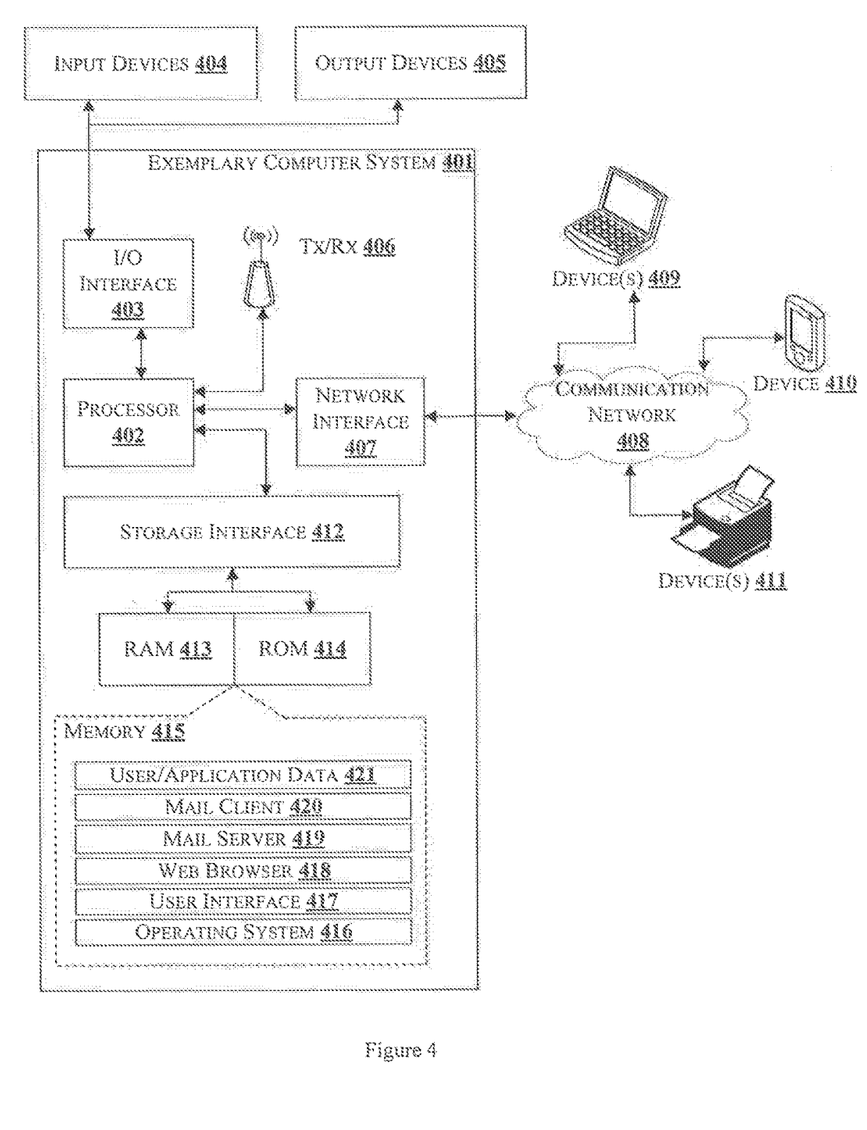
FIG. 4 is a block diagram of an exemplary computer system for implementing embodiments consistent with the present disclosure.

FIG. 4 is a block diagram of an exemplary computer system for implementing embodiments consistent with the present disclosure.

Variations of computer system 401 may be used for implementing all the computing systems that may be utilized to implement the features of the present disclosure. Computer system 401 may comprise a central processing unit ("CPU" or "processor") 402. The processor 402 may comprise at least one data processor for executing program components for executing user- or system-generated requests. The processor 402 may include specialized processing units such as integrated system (bus) controllers, memory management control units, floating point units, graphics processing units, digital signal processing units, etc. The processor 402 may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver 406 may facilitate various types of wireless transmission or reception. For example, the transceiver may include an antenna operatively connected to a transceiver chip (e.g., Texas Instruments WiLink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, Ethernet (e.g., twisted pair 10/40/400 Base T), transmission control protocol/internet protocol (TCP/IP), token ring, IEEE 802.11a/b/ g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices 409, 410 and 411 may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface 412 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 415 may store a collection of program or database components, including, without limitation, an operating system 416, a user interface application 417, a web browser 418, a mail server 419, a mail client 420, user/application data 421 (e.g., any data variables or data records discussed in this disclosure), etc. The operating system 416 may facilitate resource management and operation of the computer system 401. Examples of the operating system 416 include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. The user interface application 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser 418 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. The web browser 418 may utilize facilities such as AJAX, DHTML, Adobe Flash, JavaScript, Java, application programming interfaces (APIs), etc. In some embodiments, the computer system 401 may implement a mail server 419 stored program component. The mail server 419 may be an Internet mail server such as Microsoft Exchange, or the like. The mail server 419 may utilize facilities such as ASP, ActiveX, ANSI C++/C#, Microsoft .NET, CGI scripts, Java, JavaScript, PERL, PHP, Python, WebObjects, etc. The mail server 419 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client 420 may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile Advantages of the Embodiment of the Present Disclosure are Illustrated Herein In an embodiment, the present disclosure provides a method for monitoring the status or health of the refrigeration and predict the chance for maintenance by leveraging the time stamped temperature data & statistical means.

In an embodiment, the monitoring system of the present disclosure enables enterprise view of the asset health system to the needs of the customer, reducing the operational cost, wastage of food & maintain the Food safety norms as per the standard.

It is intended that the disclosure and examples be considered as exemplary only, with a true scope and spirit of disclosed embodiments being indicated by the following claims.

What is claimed is:

1. A method of monitoring a refrigeration system, the method comprising:
   receiving, by a refrigeration monitoring system, a plurality of real-time temperature data from at least one temperature sensor coupled with the refrigeration system;
   determining, by the refrigeration monitoring system, at least a first steady state value and a second steady state value based on the plurality of real-time temperature data;
   computing, by the refrigeration monitoring system, a plurality of defrost cycle parameter values including at least defrost start time value, defrost end time value, peak temperature value, heater OFF time value, and heater ON duration value based on at least the first steady state value and the second steady state values; and
   generating, by the refrigeration monitoring system, one or more alarm signals based on determination of deviations of at least one of the defrost cycle parameter values from respective predetermined threshold values;
   wherein the determining the first steady state value comprises:
   comparing each of the plurality of the real-time temperature data with a predetermined percentile temperature value; and
   determining one of the plurality of the real-time temperature data that exceeds the predetermined percentile temperature value as the first steady state value.

2. The method as claimed in claim 1, wherein the computing the plurality of defrost cycle parameters comprises:
   obtaining time stamp of the first steady state value as the defrost start time value;
   determining one of the plurality of the real-time temperature data having highest temperature value as the peak temperature value;
   determining the time stamp of the peak temperature value as the heater OFF time value;
   calculating the heater ON duration value based on the defrost start time value and the heater OFF time value;
   determining the timestamp of the second steady state value as the defrost end time value, the second steady state value is the real-time temperature data that exceeds the predetermined percentile temperature value during defrost operation; and
   computing the defrost cycle duration value based on the defrost start time value and the defrost end time value.

3. The method as claimed in claim 1, wherein the generating the one or more alarm signals comprises:
   determining a count of defrost cycles occurring in a predetermined time and performing a first comparison of the count of defrost cycles with a predetermined count value;
   generating a first alarm signal based on the first comparison;
   determining occurrence of the defrost cycles as per a predetermined schedule;
   generating a second alarm signal based on the determination;
   performing a second comparison of the heater ON duration value with a predetermined heater operation period; and
   generating a third alarm signal based on the second comparison.

4. The method as claimed in claim 3, where the generating the one or more alarm signals further comprises:
   determining a compressor inefficiency detection value based on the first steady state value and the plurality of real-time temperature data obtained through the at least one temperature sensor; and
   generating a fourth alarm signal indicating flag for maintenance based on the determination.

5. The method as claimed in claim 1, further comprising generating one or more visualization reports associated with patterns of defrost duration and defrost duration distribution over a time and providing one or more recommendations to support maintenance of the refrigeration system in response to determination of deviations of at least one of the defrost cycle parameters.

6. The method as claimed in claim 1, further comprising updating a data repository with the plurality of real-time temperature data along with the timestamp, the plurality of defrost cycle parameters, the one or more deviations of the at least one defrost cycle parameters and one or more recommendations to support maintenance of the refrigeration system.

7. The method of claim 1 wherein the computing the plurality of defrost cycle parameter values comprises machine learning.

8. The method of claim 1 wherein the refrigeration system comprises a walk-in freezer.

9. A system for monitoring a refrigeration system, said system comprising:
   a processor;
   at least one temperature sensor coupled with the processor; and
   a memory, communicatively coupled to the processor, wherein the memory stores processor-executable instructions, which, on execution, cause the processor to:
   receive a plurality of real-time temperature data from the at least one temperature sensor;
   determine at least a first steady state value and a second steady state value based on the plurality of real-time temperature data thus received;
   compute a plurality of defrost cycle parameter values including at least defrost start time value, defrost end time value, peak temperature value, heater OFF time value, and heater ON duration value based on at least the first steady state value and the second steady state value; and generate one or more alarm signals based on determination of deviations of at least one of the defrost cycle parameter values from respective predetermined threshold values;

wherein the processor is configured to determine the first steady state value by:

comparing each of the plurality of the real-time temperature data with a predetermined percentile temperature value; and determining one of the plurality of the real-time temperature data that exceeds the predetermined percentile temperature value as the first steady state value.

10. The system as claimed in claim 9, wherein the processor is configured to compute the plurality of defrost cycle parameters by:

obtaining time stamp of the first steady state value as the defrost start time value;

determining one of the plurality of the real-time temperature having highest temperature value as the peak temperature value;

determining the time stamp of the peak temperature value as the heater OFF time value;

calculating the heater ON duration value based on the defrost start time value and the heater OFF time value;

determining the timestamp of the second steady state value as the defrost end time value, the second steady state value is the real-time temperature data that exceeds the predetermined percentile temperature value during defrost operation; and computing the defrost cycle duration value based on the defrost start time value and the defrost end time value.

11. The system as claimed in claim 9, where the processor is configured to generate the one or more alarm signals by:

determining a count of defrost cycles occurring in a predetermined time and performing a first comparison of the count of defrost cycles with a predetermined count value;

generating a first alarm signal based on the first comparison;

determining occurrence of the defrost cycles as per a predetermined schedule;

generating a second alarm signal based on the determination;

performing a second comparison of the heater ON duration value with a predetermined heater operation period; and generating a third alarm signal based on the second comparison.

12. The system as claimed in claim 11, where the processor is further configured to:

determining a compressor inefficiency detection value based on at least the first steady state value and the second steady state value and the plurality of real-time temperature data obtained through the plurality of temperature sensors; and generating a fourth alarm signal indicating flag for maintenance based on the determination.

13. The system as claimed in claim 9, wherein the processor is further configured to generate one or more visualization reports associated with patterns of defrost duration and defrost duration distribution over a time and provide one or more recommendations to support maintenance of the refrigeration system in response to determination of deviations of at least one of the defrost cycle parameters.

14. The system as claimed in claim 9, further comprising a data repository coupled with the processor, and configured to store and update the plurality of real-time temperature data along with the timestamp, the plurality of defrost cycle parameters, the one or more deviations of the at least one defrost cycle parameters and one or more recommendations to support maintenance of the refrigeration system.

15. A non-transitory computer readable medium including instructions stored thereon that when processed by at least one processor cause a refrigeration monitoring system to perform acts of:

receiving a plurality of real-time temperature data from at least one temperature sensor coupled with the at least one processor;

determining at least a first steady state value and a second steady state value based on the plurality of real-time temperature data thus received;

computing a plurality of defrost cycle parameter values including at least defrost start time value, defrost end time value, peak temperature value, heater OFF time value, and heater ON duration value based on at least the first steady state value and the second steady state value; and generating one or more alarm signals based on determination of deviations of at least one of the defrost cycle parameter values from respective predetermined threshold values;

wherein the instructions stored thereon causes the at least one processor to determine the first steady state value by:

comparing each of the plurality of the real-time temperature data with a predetermined percentile temperature value; and determining one of the plurality of the real-time temperature data that exceeds the predetermined percentile temperature value as the first steady state value.

16. The medium as claimed in claim 15, wherein the instructions stored thereon causes the at least one processor to compute the plurality of defrost cycle parameters by:

obtaining time stamp of the first steady state value as the defrost start time value;

determining one of the plurality of the real-time temperature having highest temperature value as the peak temperature value;

determining the time stamp of the peak temperature value as the heater OFF time value;

calculating the heater ON duration value based on the defrost start time value and the heater OFF time value;

determining the timestamp of the second steady state value as the defrost end time value, the second steady state value is the real-time temperature data that exceeds the predetermined percentile temperature value during defrost operation; and computing the defrost cycle duration value based on the defrost start time value and the defrost end time value.

17. The medium as claimed in claim 15, where the instructions stored thereon causes the at least one processor to generate the one or more alarm signals by:

determining a count of defrost cycles occurring in a predetermined time and performing a first comparison of the count of defrost cycles with a predetermined count value;

generating a first alarm signal based on the first comparison;

determining occurrence of the defrost cycles as per a predetermined schedule;

generating a second alarm signal based on the determination;

performing a second comparison of the heater ON duration value with a predetermined heater operation period; and generating a third alarm signal based on the second comparison.

18. The medium as claimed in claim 17, where the instructions stored thereon further causes the at least one processor to:

determine a compressor inefficiency detection value based on at least the first steady state value and the second steady state values and the plurality of real-time temperature data obtained through the plurality of temperature sensors; and generate a fourth alarm signal indicating flag for maintenance based on the determination.

19. The medium as claimed in claim 15, wherein the instructions stored thereon causes the at least one processor to:

generate one or more visualization reports associated with patterns of defrost duration and defrost duration distribution over a time and provide one or more recommendations to support maintenance of the refrigeration system in response to determination of deviations of at least one of the defrost cycle parameters; and update a data repository coupled with the processor with the plurality of real-time temperature data along with the timestamp, the plurality of defrost cycle parameters, the one or more deviations of the at least one defrost cycle parameters and one or more recommendations to support maintenance of the refrigeration system.

* * * * *